United States Patent [19]

Guyatt et al.

[11] Patent Number: 4,756,338

[45] Date of Patent: Jul. 12, 1988

[54] PIPE REPAIR ASSEMBLIES TO REPAIR PIPE WHEN FLUIDS THEREIN ARE UNDER HIGH PRESSURE

[75] Inventors: George R. Guyatt; Gregory R. Markley, both of Spanaway, Wash.

[73] Assignee: Thrust Corporation, Spanaway, Wash.

[21] Appl. No.: 58,806

[22] Filed: Jun. 5, 1987

[51] Int. Cl.$^4$ .............................................. F16L 55/16
[52] U.S. Cl. .................................................... 138/99
[58] Field of Search ........................... 138/99; 285/197

[56] References Cited

U.S. PATENT DOCUMENTS

| | | | |
|---|---|---|---|
| 1,831,641 | 11/1931 | Skinner | 285/197 |
| 2,616,736 | 11/1952 | Smith | 138/99 X |
| 3,258,822 | 7/1966 | Schlesch et al. | 138/99 X |
| 3,280,846 | 10/1966 | Anderson et al. | 138/99 X |
| 3,737,180 | 6/1973 | Hayes, Jr. et al. | 138/99 X |
| 3,861,422 | 1/1975 | Christie | 138/99 |
| 3,954,288 | 5/1976 | Smith | 138/99 X |
| 4,240,650 | 12/1980 | Adams | 138/99 X |

*Primary Examiner*—Mark J. Thronson
*Attorney, Agent, or Firm*—Roy E. Mattern, Jr.

[57] ABSTRACT

When a pipe confining fluid under pressure develops a leak, a selected respective pipe repair assembly is used to stop the leak, while the pipe continues trying to confine the fluid under pressure. There is no need to shut down operations. A cylinder, provided in two longitudinal sections, with one section having an opened central valve and an inner sealing gasket with a hole matching the entry of the opened central valve, is secured around the pipe and over the leaking area. During the positioning of this pipe repair assembly, a half cylindrical sleeve with an upstanding end tab, and a hole with a partial length central longitudinal opening is provided for protective initial interior placement over the sealing gasket. This tab fits into an end notch on one longitudinal section, to thereby position the hole with a partial length central longitudinal opening in horizontal alignment with the opening of the valve. As so arranged and presecured, without complete tightening, this pipe repair assembly is moved sideways along the pipe and over the leak, placing the open valve over the leak. The exiting fluid is then directed out of the valve. Thereafter, the half cylindrical sleeve is withdrawn, having completed its protection of the sealing gasket from the fluid under high pressure leaving the pipe through the leak. Then the pipe repair assembly is tightened and the valve is closed, stopping the leak.

4 Claims, 3 Drawing Sheets

PIPE REPAIR ASSEMBLIES TO REPAIR PIPE WHEN FLUIDS THEREIN ARE UNDER HIGH PRESSURE

BACKGROUND

It is understood that today when a leak occurs in a pipe carrying fluid under pressure, the attempt is made to shut down the system at the nearest valve. If this is a considerable distance away, or non existent, or the piping system must remain under pressure, then a so called jiffy clamp assembly is used, if it is possible to install it. A gasket is wrapped around the pipe, then surrounded by a metal cover, and both are secured with pipe clamps. If the leak is topped, this repair is still not considered as being too effective for any considerable length of operating time.

Such jiffy clamps are believed to be like those disclosed in U.S. patents such as: U.S. Pat. Nos. 4,172,472; 4,606,377; 4,413,388; 3,848,638; 3,914,833; and 2,897,568.

In reference to other U.S. patents, where products are disclosed to be used in stopping high pressure leaks in fluid lines:

Mr. John Watson in his U.S. Pat. No. 2,199,552 in 1940 discloses his high pressure vented guide plug clamp used to place a seal over a hole-like leak or limited size crack. The fluid continues to leak through the sealing plug assembly until just the final section of pressing the plug, i.e. the seal into contact with the pipe in the area of the leak.

Mr. John Tipton in his U.S. Pat. No. 2,492,507 in 1949, illustrates and describes his high pressure pipe patch wherein he also controls the venting of fluids directing them to a distant place for discharge, until the sealing of the leaking pipe is completed, first relying on gaskets and then welding.

Mr. Herbert H. Ice in his U.S. Pat. No. 2,002,577 in 1935, illustrates and describes his hydraulic safety pipe line repair device to repair alive leaks by using first a flexible tubing to stop the leak and surrounding this tubing by using a metal cover welded in place.

Messrs. Risley and Hoke in their U.S. Pat. No. 2,843,155 in 1958 disclosed their pipe repair clamp used to repair leaks in a pipe carrying fluids under high pressure. It is an improvement over the jiffy type clamps in respect to the tightening and positioning of the sealing unit.

Messrs. Sochnlen and Alters in their U.S. Pat. No. 2,850,045 in 1958, disclosed their pipe leak sealing device to repair fluid lines under pressure by placing a patch over the leak and welding the patch in place.

Messrs. Saylor and Habegger in their U.S. Pat. No. 4,391,300 of 1983, illustrated and disclosed their pipe patching clamp used during the continuing opertion of a piping system carrying fluids under pressure to repair either a hole-like leak or a split-crack leak.

Other very specific enclosures and/or methods and apparatus used to stop leaks about pipe surfaces and/or about pipe fittings are disclosed in U.S. Patents such as: U.S. Pat. Nos. 4,133,351; 4,171,142; 4,576,401; 4,652,023; 4,111,234 and 3,944,260.

Mr. George Brown in his U.S. Pat. No. 4,508,129, in 1985 disclosed his pipe repair bypass system for conducting fluids around a leak area during the leak repair operations.

Mr. Vernie Farris in his U.S. Pat. No. 2,899,983 of 1959, illustrated and described his method and apparatus for repairing a fluid pressure line. He stops the leak, then shuts off the flow upstream of the leak, replaces a portion of the pipe, and then commences the flow again.

Mr. Charles Ray in his U.S. Pat. No. 3,626,576 of 1971, illustrated and described his method and apparatus for repairing lines such as gas mains and the like, while these mains remained in operation. He placed a sealed collar around the leak locale, and vented the leaking gas through a valve wherein the leaking gas could be shut off and turned on. Such on and off positions of the valve were undertaken as the balance of his apparatus was operated to repair the hole-like leak, drilling, tapping, and inserting a repair plug.

Although these prior inventors all accomplished very worthwhile repairs and replacements by using their methods and apparatus, there still remains a need for methods and apparatus to stop leaks of both hole-like and banana peel like configurations occurring in high pressure fluid systems quickly, at comparatively lower costs, safely, and essentially permanently, until a fluid system is shut down for other reasons, such as a general overhaul. Then at such a shutdown time, a new pipe is used, and the emergency repair apparatus is reclaimed for reuse in another future emergency time, when a high pressure leak occurs during a continuous needed operational time of a high pressure fluid system.

SUMMARY

When pipes carrying fluids under pressure develop a leak, quite often shutoff valves in the overall pipe system are not conveniently located nearby the leak. Moreover, there often is a need to help the overall pipe system in continuous operation. Then in some situations there is no shutoff valve in the system ahead of the leak locale. Now when a leak does occur under these otherwise unfortunate times and places, there are selectable respective pipe repair assemblies ready to be used to stop the leak, while the overall pipe system remains under pressure.

When the leak is hole-like in configuration, the selected pipe repair assembly embodiment is preassembled closely about the pipe at a safe distance from the leak. Then it is moved sideways over the leak, as its own valve remains open, providing an exit for the leaking fluid. Then this pipe repair assembly is firmly tightened about the pipe at this leak locale, completing a seal about the leak, except for the valve opening. Subsequently, the valve is closed and the overall leak at this locale is effectively stopped for a long time. During the sideways movement of the pipe repair assembly, its internal gasket is protected by a sleeve, until the hole in the gasket is in alignment with the hole-like leak. This sleeve is then removed before this pipe repair assembly is fully tightened in place.

When the leak is a crack-leak, or a peel-like leak, often referred to as a banana peel leak, the selected pipe repair assembly embodiment is assembled about the leak locale to create in effect a much larger diameter pipe section about the leak. This selected embodiment has two halves which have encompassing flanges for leak tight securement using gaskets and fasteners. At each end of each half there are half ring-like ends, which are sealably secured to their respective halves. Also at the insides of these half ring-like ends, there are sealing members to create a circumferential seal around the pipe. One of the halves has a central smaller diameter pipe sealably secured perpenicular to it, presenting a mounting place for a valve. The selected valve secured to the central smaller diameter pipe is kept open during the assembly of this selected pipe repair assembly about the pipe carrying the fluid under pressure. After the securement of all the flanges with the gaskets in place, and with the sealing members in place at the half ring-like ends, then the selected valve is closed completing the repair of the pipe, while this pipe remains in service under fluid pressure.

The materials used in these embodiments of the pipe repair assemblies are selected, so the resulting repairs are considered permanent repairs in respect to completely overcoming the original leaks. Yet whenever the overall piping system is intentionally shut down, then these pipe repair asesemblies may be removed, as the defective pipe is replaced during the shutdown. Thereafter these removed pipe repair assemblies are kept handy to be used again during another emergency.

DRAWINGS

The pipe repair assemblies and their use in methods to repair pipe, when fluids therein are under pressure, are illustrated in the drawings, wherein:

FIG. 1 is a perspective exploded view of the pipe repair assembly used to stop a hole-like leak, indicating such a leak in a pipe under fluid pressure, and showing the positioning and assembly of the components thereof, including the temporary use of a sleeve which protects the sealing gasket, during the sideways placement of this preassembled pipe repair assembly over the hole-like leak;

FIG. 2 is a perspective view of this pipe repair assembly positioned over the hole-like leak with its valve open allowing the fluid to continue to leak under pressure, with dotted lines indicating the removal of the sleeve which has protected the sealing gasket, and with direction arrows indicting the tightening of the fastener assemblies to secure this pipe repair assembly in place over the hole-like leak, with the valve ready to be closed to complete the overall leak repair in a very permanent way;

Figure 7:
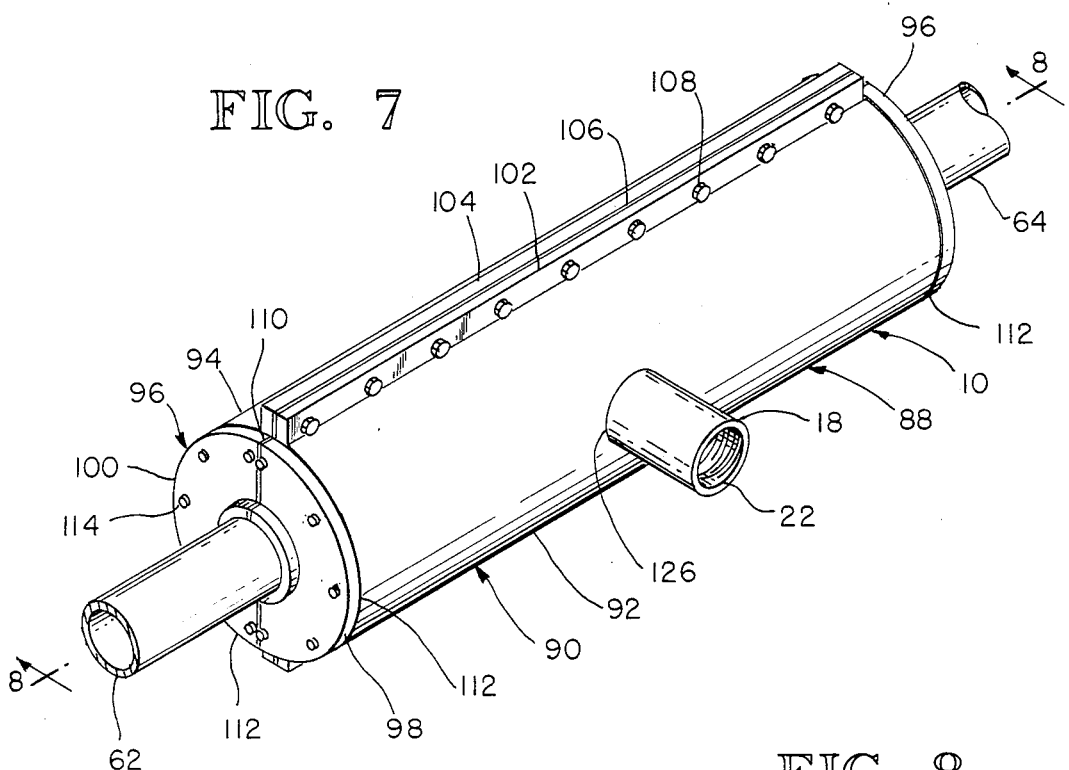
Figure 8:
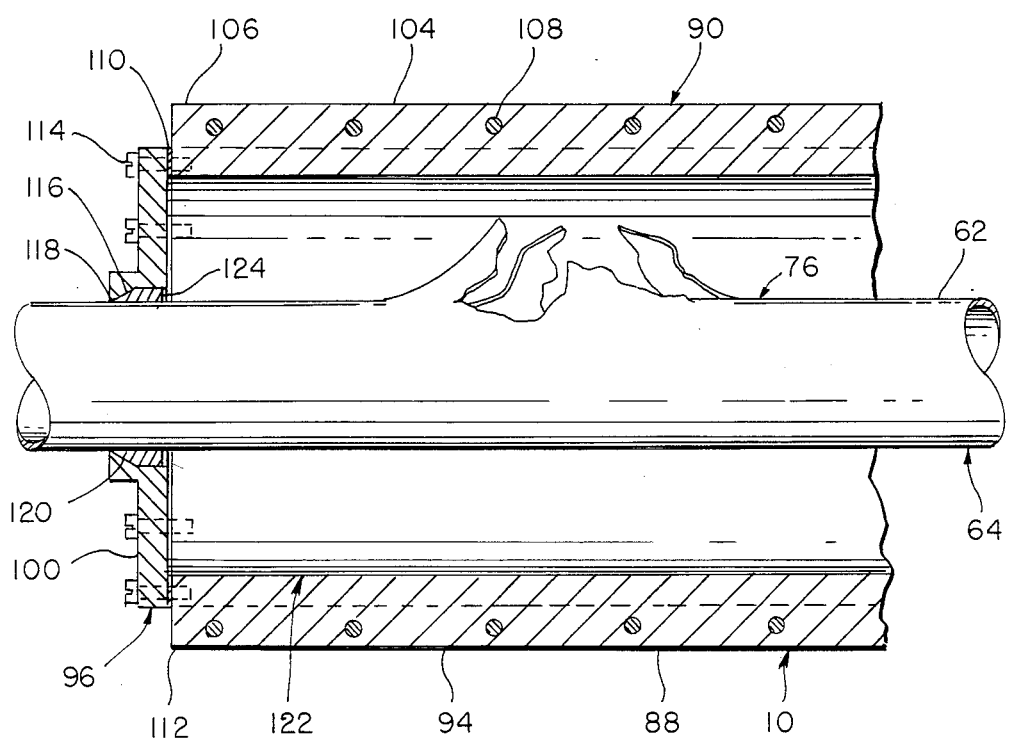

FIG. 7 is a perspective view of another pipe repair assembly used to stop a crack leak, or a peel-like leak, or an irregular opening leak, illustrating its placement which in effect creates a larger diameter pipe in the vicinity of the leak, with seals at each of the ends, and longitudinal sealing gaskets along longitudinal and transverse flanges of the two matching halves, with one half having a valve; and FIG. 8 is a perspective sectional view taken along line 8—8 of FIG. 7 to illustrate the leak in the pipe, the end circular seals and the transverse and longitudinal gaskets.

DESCRIPTION OF THE PREFERRED EMBODIMENTS

Pipe Repair Assembly to Stop Hole-Like Leak

The pipe repair assembly 10 in one embodiment 12 is illustrated in FIGS. 1 through 4, as used in successfully stopping a hole-like leak 13 in a pipe, when fluids therein are under pressure. As shown in the exploded view of FIG. 1, there are two cylindrical halves 14 and 16. A perpendicular smaller diameter pipe 18 is welded to half 14 at a central hole 20 and extends out to receive on a threaded end 22, a valve 24. The bottom interior longitudinal flange edge 26 of half 14 has spaced small cylindrical projections 28, which upon assembly fit into spaced small cylindrical holes 30 on the bottom interior longitudinal flange edge 32 of half 16.

Figure 4:
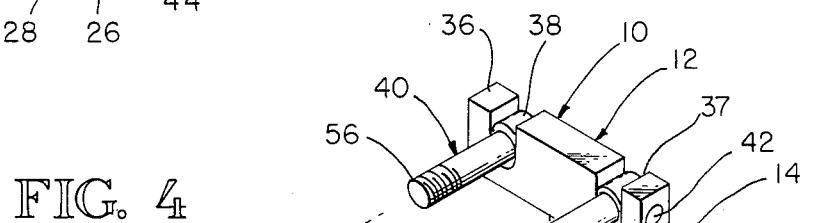
FIG. 4 is a perspective view of the interior of the longitudinal half of the pipe repair assembly having the valve to show the recess which is formed with a surrounding confinement abutment to receive and to positon a sealing gasket, and to illustrate this sealing gasket which is placed in the recess.

On the exterior of the top longitudinal flange edge 34 of half 14, a raised rectangular anchor body 36 is contoured with two slots 37 to receive two spaced ring head 38 threaded bolts 40 secured by a longitudinal pin 42, in turn secured in the anchor body 36. The interior of half 14 has a recess 44, as shown in FIG. 4, with a surrounding confinement abutment 46 to position the interior sealing gasket 48, having a slot 49 and a central hole 50 in alignment with the small diameter perpendicular pipe 18.

On the exterior of the top longitudinal flange edge 52 of half 16, a raised rectangular receiving body 54 is contoured with two slots 37, to receive the pivoting threaded ends 56 of the two spaced ring head 38 threaded bolts 40. When these cylindrical halves 24 and 16 are pretightened and finally tightened then washers 58 and nuts 60 are used.

Figure 1:
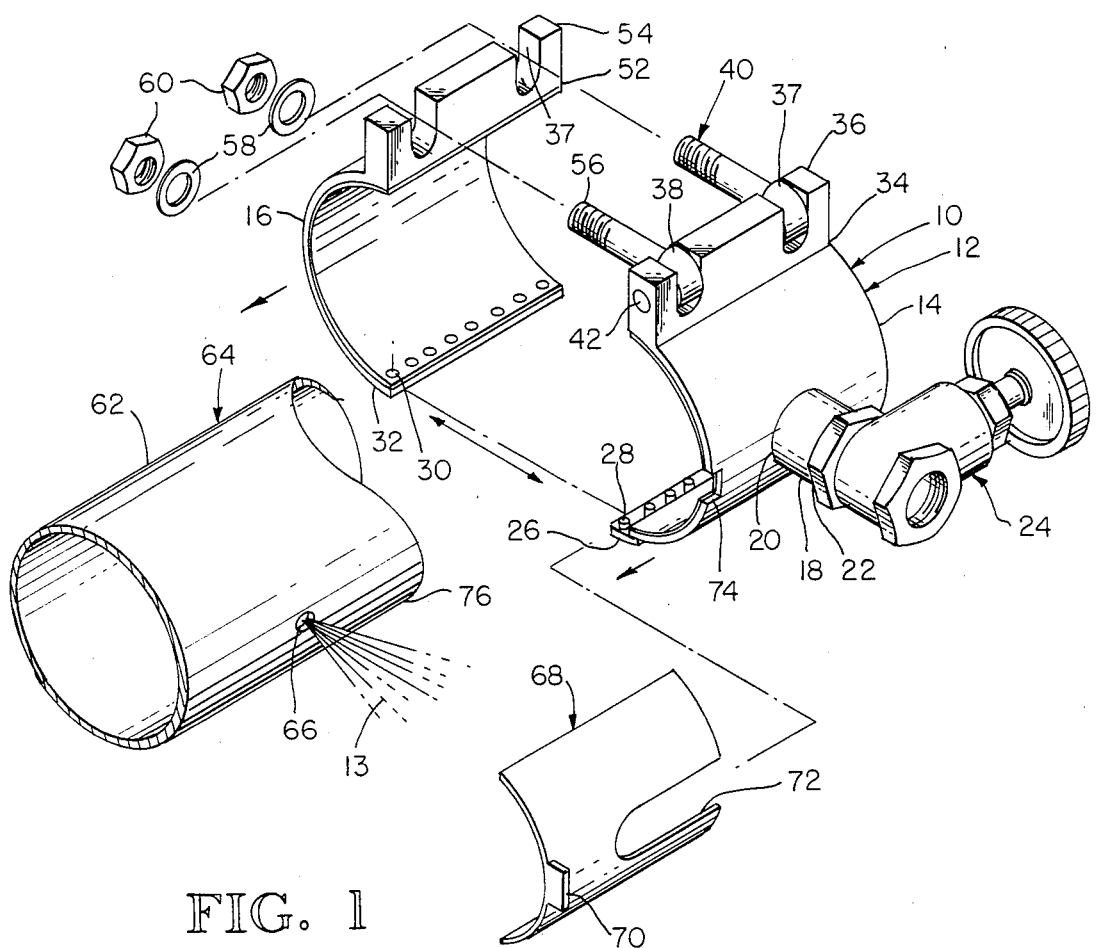
Figure 2:
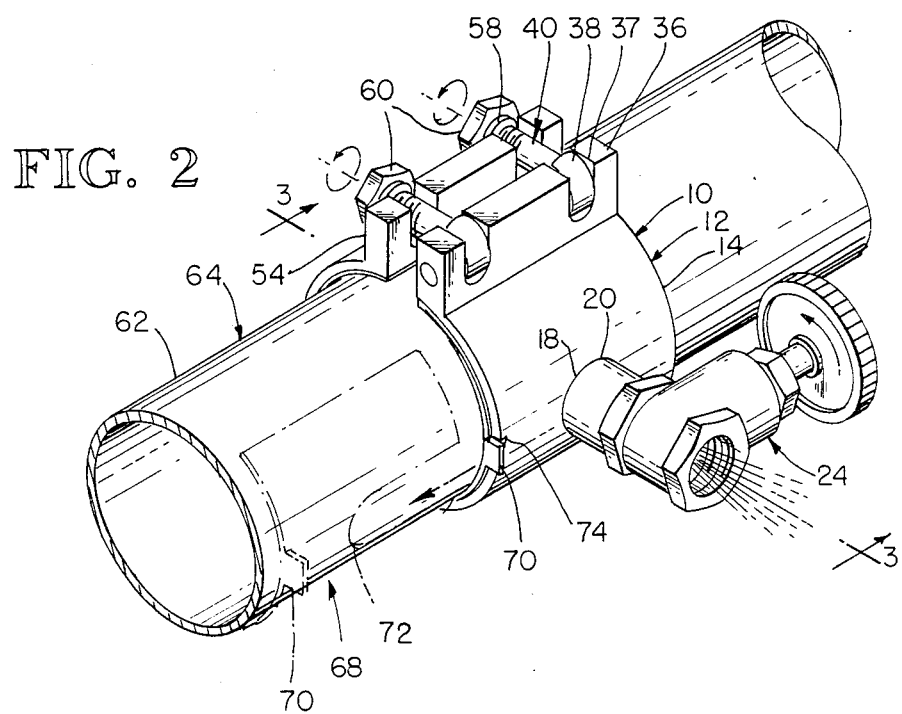
Figure 3:
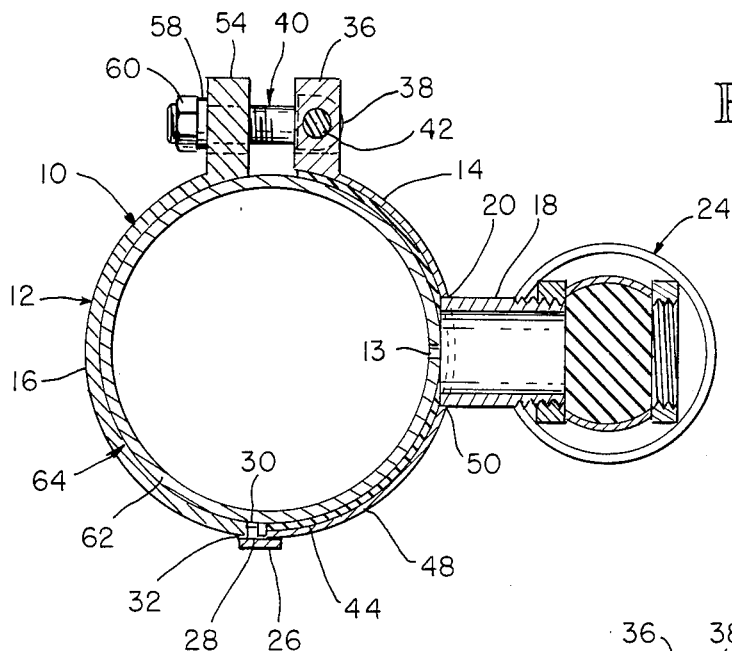
FIG. 3 is a sectional view taken along line 3—3 of FIG. 2, to illustrate how the pipe repair assembly with its valve closed has become completely effective in overcoming the hole-like leak in the pipe confining fluid under pressure.

In FIG. 1 a portion of a pipe 62 of a pressure piping system 64 is illustrated having a hole-like opening 66, which is not wanted, and which is allowing the escape of fluid 13 under pressure. Also shown in FIG. 1, is a protective sleeve 68 having an end upstanding tab 70 and a partial longitudinal opening 72. It is placed inside the half 14 and the tab 70 is positioned in the notch 74 in the half 14, whereby the tab 70, notch 74, and the perpendicular pipe 18 are all longitudinally aligned.

The assembly of this pipe repair hole leak embodiment 12 of the pipe repair assembly 10 is undertaken about the pipe 62, at a safe distance away from the hole-like opening 66. Then this embodiment 12 is moved sideways over the leak locale 76 so the hole-like opening 66 becomes aligned with the perpendicular pipe 18 and the opened valve 24. The protective sleeve 68 is withdrawn using the tab 70. Then the nuts 60 are finally tightened firmly securing this embodiment 12 of the pipe repair assembly 10 in place. Thereafter the valve 24 is closed and the leak is stopped in a very reliable long lasting installation 12, as shown by referring to FIGS. 2 and 3.

Other Bottom Flange Connections

Figure 5:
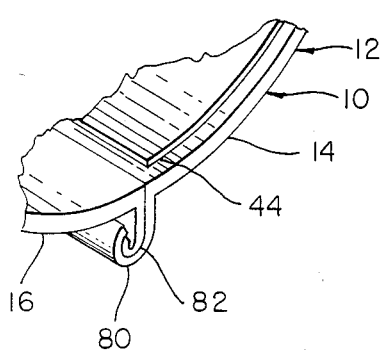
FIG. 5 is a perspective view of another joining assembly of the bottoms of each of the longitudinal halves of this pipe repair assembly.
Figure 6:
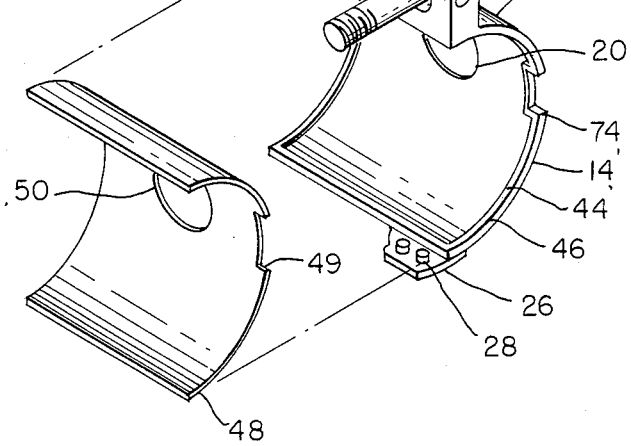
FIG. 6 is a perspective view of another joining assembly of the bottoms of each of the longitudinal halves of this pipe repair assembly.
Figure 6:
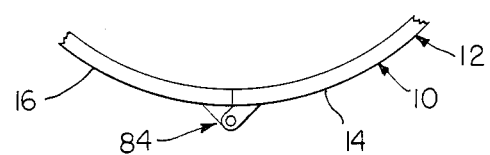

Other bottom flange connections are illustrated in FIGS. 5 and 6. In FIG. 5, the bottom flange edge 26 of cylindrical half 14 has one portion 80 of circular configuration to interfit with another portion 82 of circular configuration on the bottom flange edge 32 of cylindrical half 16. Only in one relative rotative position of the cylindrical halves 14 and 16 may then be joined or separated with respect to the interfitting of the circular configuration portions 80, 82. In FIG. 6, the cylindrical halves 14 and 16 are shown joined together by a piano hinge 84.

Pipe Repair Assembly to Stop Peel, Etc. Leak

The pipe repair assembly 10, in another embodiment 88 is illustrated in FIGS. 7 and 8, as used in successfully stopping a peel-like, or blow out, leak in a pipe 62, when fluids therein are under pressure. The completed installation of this embodiment 88 about a pipe 62 of a piping system 64 is shown in FIG. 7, and the interior of this embodiment 88 is illustrated in FIG. 8. A larger diameter cylinder 90, serving as a larger diameter appearing pipe, produced in two cylindrical halves 92, 94, has pipe enclosing ends 96, also made in respective halves 98, 100. All of these halves include complementary exterior longitudinal flanges 102, 104, with gasket material 106, and fasteners 108, which are used in firmly placing this embodiment 88 around the pipe 62 in the leak locale 76. Also a gasket material 110 is used where the respective halves 98, 100 of the enclosing ends 96 fit against the ends 112 of the two cylindrical halves 92, 94. These enclosing ends 96 are secured to the cylindrical halves 92, 94 by using the fasteners 114. In addition to the sealing undertaken by using the gasket materials 106 and 110, split ring seals 116 with tapered leading edges 118 are used to create a circular seal between the pipe 62 and the enclosing ends 96 of the larger diameter cylinder 90. Each half 98, 100 of the ends 96 are formed with tapered recesses 120 to receive the like tapered split ring seals 116. The internal pressure of the fluid filling the volume 122, located between the pipe 62 and the larger diameter cylinder 90, in acting on the exposed ends 124 of the split ring seals 116, insures the continuation of an active and effective sealing effect about the pipe 62. The half 92 of the larger diameter cylinder 90 has a central hole 126 to which a smaller diameter short pipe 18 is welded. Threads 22 are provided on pipe 18, so a selected valve 24 may be installed.

Materials and Sizes

The selected materials used and the selected sizes of the various components to be assembled to complete respective specific embodiments of these pipe repair assemblies 10, are determined by the operational pressures of the fluids, the types of fluids, the sizes of the piping systems, and the extent and the configuration of the fluid leaks. The purpose of the invention is to provide a strong pipe repair assembly, which is conveniently preassembled in possible inconvenient spaces adjacent to a leak, and then in reference to the first embodiment is quickly moved along the pipe 62 over the leak 66, to first secure this assembly 10, remove the shield, and then to close the valve 24 to seal the piping system 64 effectively, until this pipe repair assembly 10 is intentionally removed, when a new pipe may be installed if the piping system 64 is ever shut down for some intended reason. During the installation of these pipe repair assemblies 10, the cracks in the pipes are kept from running by the strength added via these assemblies 10.

We claim:

1. A pipe repair assembly used to repair a pipe leak when the fluids therein are under high pressure, comprising:
   (a) a hollow cylinder which is sectionalized for sealed and secure placement around a pipe in the leak locale, having one section having a hole therein to allow the escape of fluids under high pressure, also having a substantial inner recess, about this hole, to receive a gasket, having a gasket positioned in this substantial inner recess, the gasket having a hole aligned with the hole in this section, which allows the escape of fluids, and having another section completing this hollow cylinder, each of these sections having integral bottom complementary interfitting mating portions, and integral top abutting bodies to receive fasteners, having fasteners to hold the abutting bodies together to complete the sealable and securable hollow cylinder;
   (b) a valve assembly secured to the one section having a hole and aligned with this hole to receive and to control the flow of fluids that pass through this hole; and
   (c) an inner sleeve sized to fit and to protect the gasket, the sleeve being positioned in the one section of the hollow cylinder, having a hole to direct fluids through the hole in the gasket, whereby the assembly can be axially preplaced and positioned along the pipe, and thereafter the sleeve can be conveniently removed without interfering with the flow of fluids leaving through the leak, and thereafter the pipe repair assembly can be finally tightened, and thereafter the valve assembly can be operated to stop the flow of fluids leaving through the leak, the hole in the gasket, and the hold in the one section of the hollow cylinder.

2. A pipe repair assembly, as claimed in claim 1, wherein the the hole of the inner sleeve extends longitudinally in the axial direction to the end of this sleeve.

3. A pipe repair assembly, as claimed in claim 1, wherein the inner sleeve has an observable tab to be kept in longitudinal alignment with the hole therein to position this hole in axial alignment with the hole in the one section and with the hole in the gasket.

4. A pipe repair assembly, as claimed in claim 2, wherein the inner sleeve has an observable tab to be kept in longitudinal alignment with the hole and the central recess therein to position this hole and this central recess in axial alignment with the hole in the one section and with the hole in the gasket.

* * * * *